Dec. 17, 1940.  C. O. CRUMP  2,225,555
CONVERTIBLE END DUMP AND ROTARY DUMP MINE CAR
Filed June 21, 1938   6 Sheets-Sheet 2
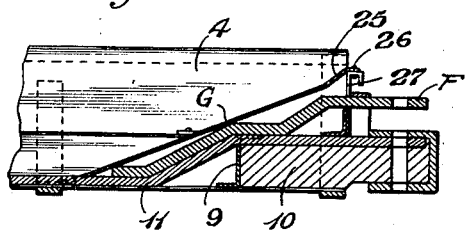
Fig. 5.
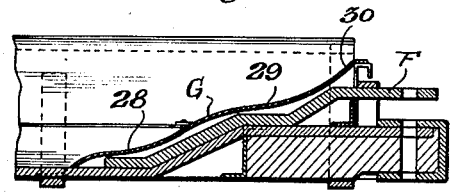
Fig. 7.
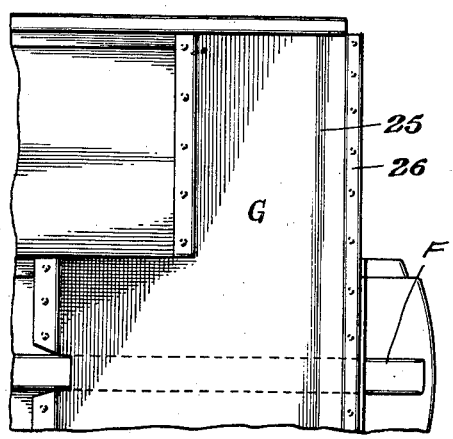
Fig. 6.
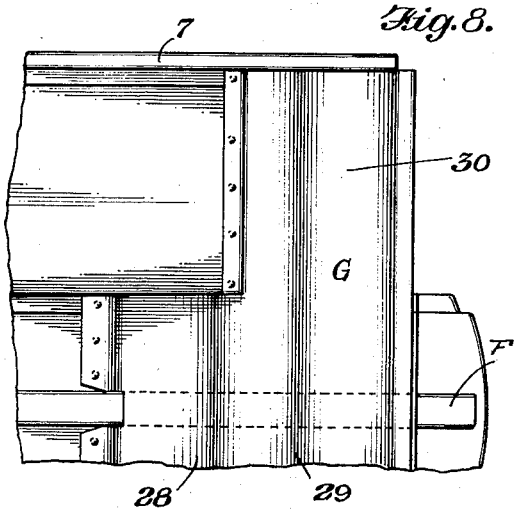
Fig. 8.
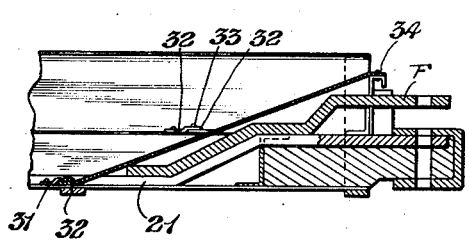
Fig. 9.
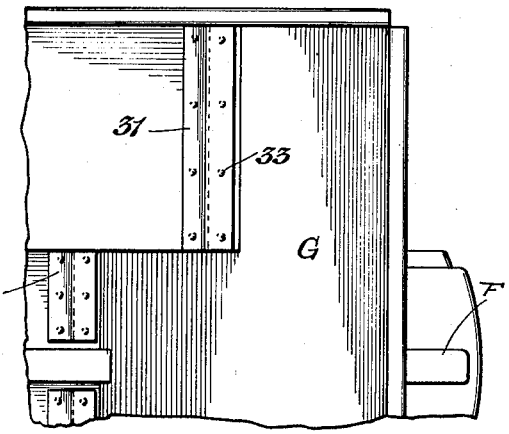
Fig. 10.
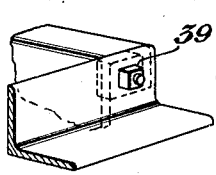
Fig. 11.
Fig. 12.
Inventor
CHARLES O. CRUMP,
By Ralph J. Bassett
Attorney Dec. 17, 1940.   C. O. CRUMP   2,225,555
CONVERTIBLE END DUMP AND ROTARY DUMP MINE CAR
Filed June 21, 1938   6 Sheets-Sheet 3
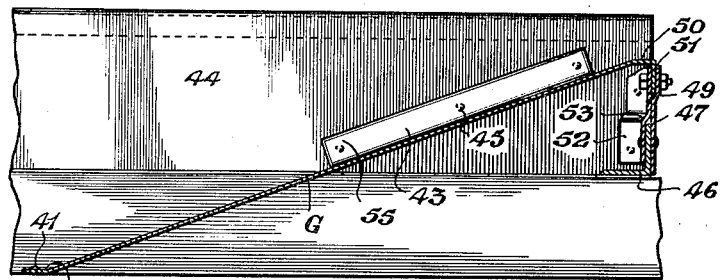
Fig. 13.
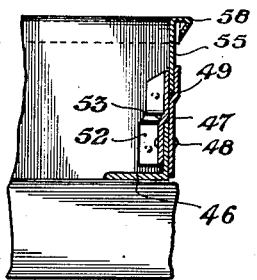
Fig. 14.
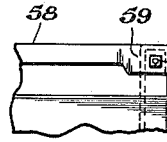
Fig. 15.
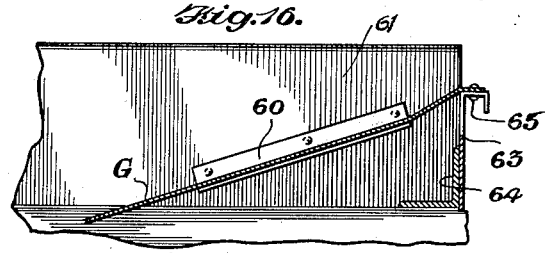
Fig. 16.
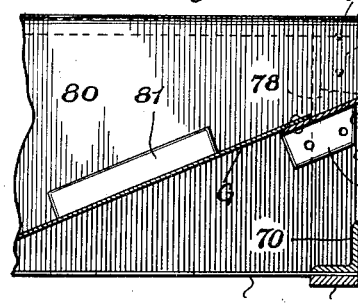
Fig. 17.
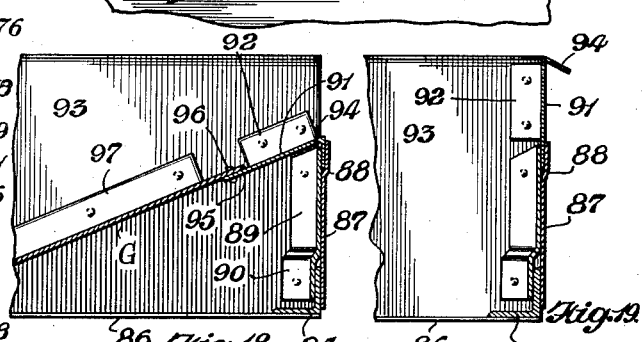
Fig. 18.
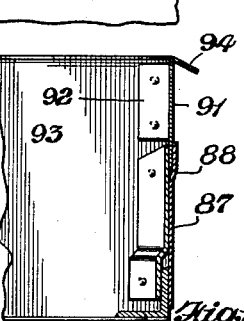
Fig. 19.
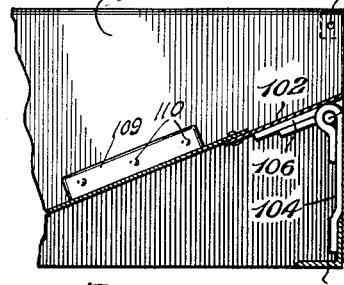
Fig. 20.
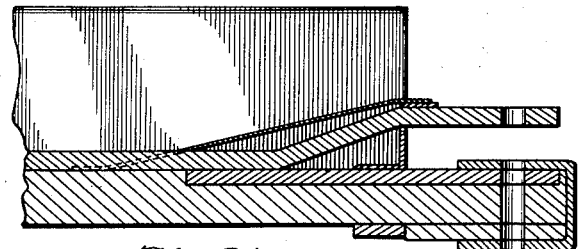
Fig. 21.
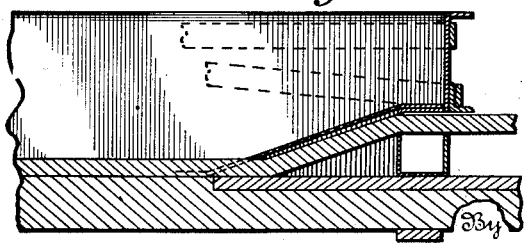
Fig. 22.   Fig. 20.ᵃ
Inventor
CHARLES O. CRUMP,
Ralph J. Bassett
Attorney Dec. 17, 1940.     C. O. CRUMP     2,225,555
CONVERTIBLE END DUMP AND ROTARY DUMP MINE CAR
Filed June 21, 1938     6 Sheets-Sheet 4

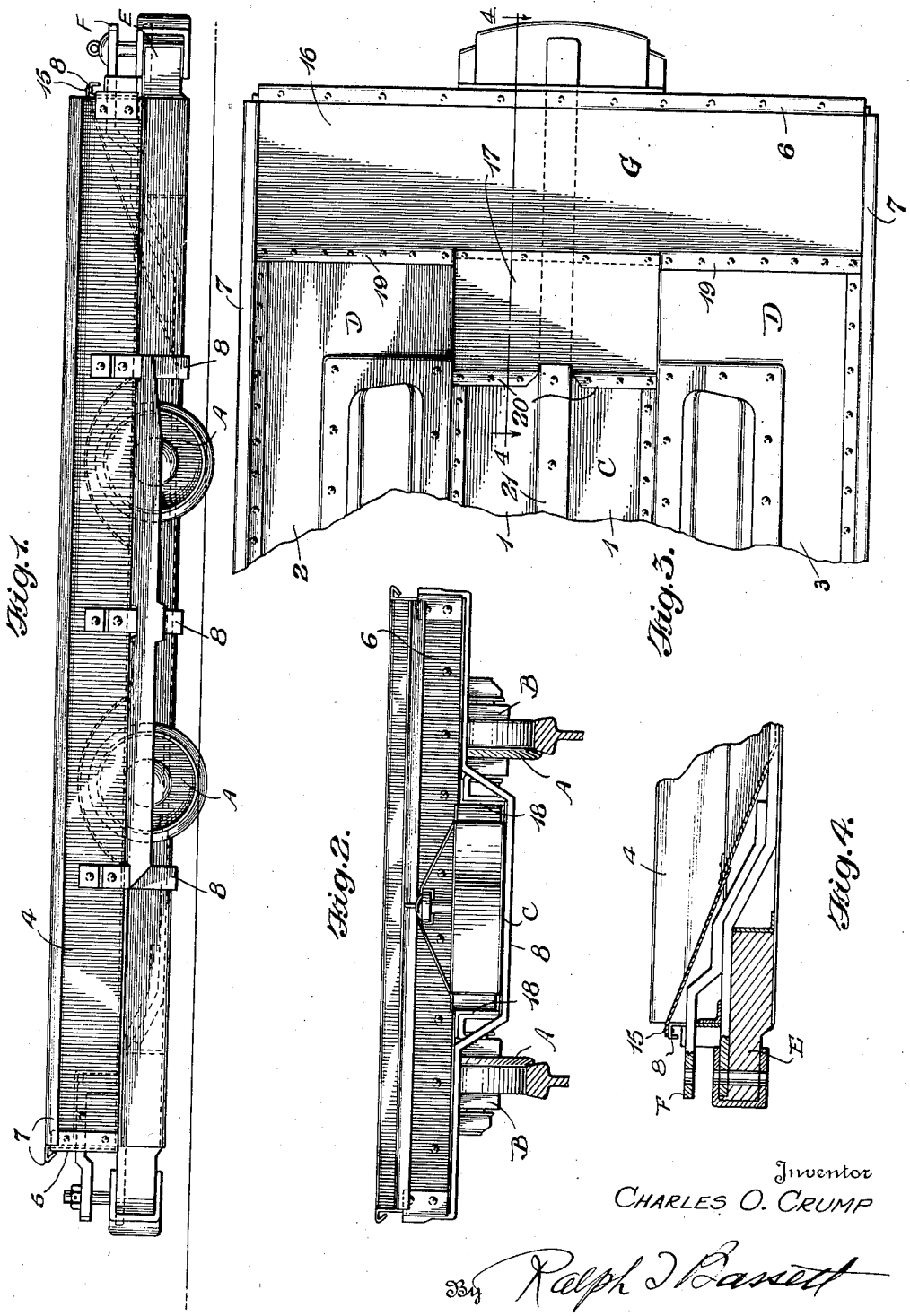

Inventor
CHARLES O. CRUMP,
By Ralph D. Barrett
Attorney

Dec. 17, 1940.   C. O. CRUMP   2,225,555
CONVERTIBLE END DUMP AND ROTARY DUMP MINE CAR
Filed June 21, 1938   6 Sheets-Sheet 5

Inventor
CHARLES O. CRUMP,
By Ralph D. Bassett
Attorney

Dec. 17, 1940.                 C. O. CRUMP                 2,225,555
           CONVERTIBLE END DUMP AND ROTARY DUMP MINE CAR
                    Filed June 21, 1938       6 Sheets-Sheet 6
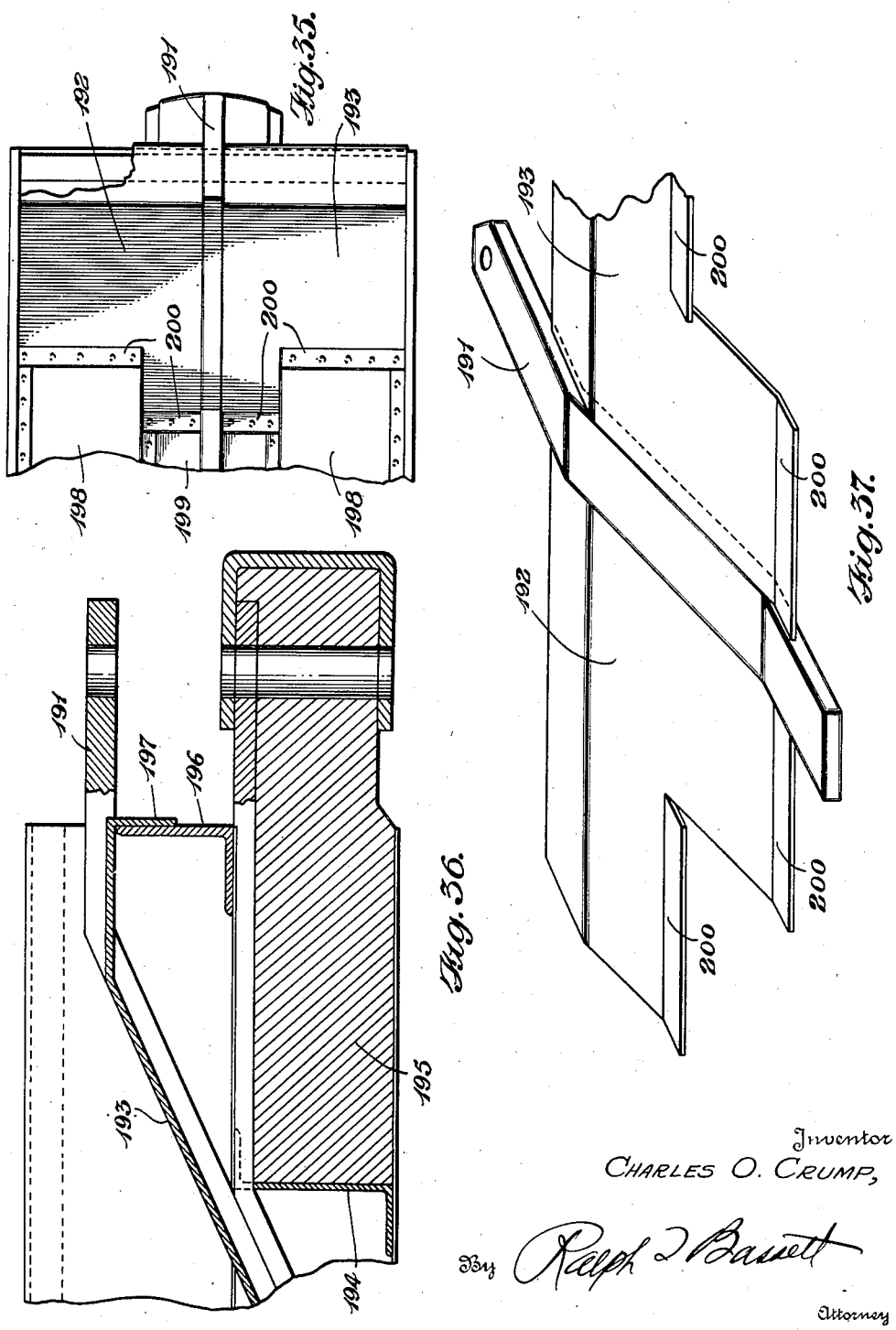
Inventor
CHARLES O. CRUMP,
By Ralph D. Bassett
Attorney Patented Dec. 17, 1940

2,225,555

UNITED STATES PATENT OFFICE 2,225,555

CONVERTIBLE END DUMP AND ROTARY DUMP MINE CAR

Charles O. Crump, Bristol, Va., assignor to Clarence P. Daniel, Bristol, Va.

Application June 21, 1938, Serial No. 215,009

12 Claims. (Cl. 105—364)

This invention relates to mine car structures and comprehends a lading body capable of use with a maximum load for either rotary dump or end dump discharge.

The main object of the present invention is to provide a mine car, which is not only convertible for use for either rotary dump or end dump, but which provides a structure of great strength and of maximum capacity in which spillage or leakage of lading is reduced to a minimum.

Another object of the invention is to provide a structure which need not include as an element the lift end or swing end gate, heretofore utilized in end dump operations and which end gates constitute a material expense in the upkeep of a mine car.

Still another object of the invention resides in the provision of a removable deflector plate for converting the car from rotary dump to end dump type, thus enabling the utilization of the same car or cars in different mines without added expense and without reducing the strength of the car structure, although the mines may be differently equipped, i. e., either for end dump or rotary dump operation.

More specifically the present development comprehends as some of its main features a mine car with one of its end walls of less height than the other end wall or side walls, and which short end wall has embodied in its structure means for detachably connecting a deflector plate whereby lading may be discharged over the shorter end wall in end dump operations or whereby a maximum capacity load may be carried by the removal of the deflector plate and during rotary dump operations.

The present invention includes in addition removable wall sections which may be utilized in building the shortened end wall to its maximum height and which removable sections may be readily detached to facilitate the connection of the removable deflector.

Another feature resides in the utilization of fastening means for the deflector plate, at its juncture with the upper marginal edge of the shorter end wall, and which fastening means are also adaptable for connecting the removable upper end gate section where the use of such section is found desirable.

Other features will hereinafter more clearly appear by reference to the accompanying drawings and specification and wherein like characters of reference designate the corresponding parts throughout the several views in which—

Fig. 1 is a side elevation of a mine car embodying one form of the present invention.

Fig. 2 is an end view of Fig. 1.

Fig. 3 is a top plan view showing the modified end structure of the mine car illustrated in Fig. 1.

Fig. 4 is a section on line 4—4 of Fig. 3.

Fig. 5 is a longitudinal section through one end of a mine car embodying the present invention and showing a modified form of deflector plate.

Fig. 6 is a top plan of a portion of the structure illustrated in Fig. 5.

Fig. 7 is a longitudinal section through the dump end of a mine car embodying a modified deflector.

Fig. 8 is a top plan of a portion of the structure illustrated in Fig. 7.

Fig. 9 is a longitudinal section through a portion of the dump end of a mine car illustrating a modified deflector.

Fig. 10 is a plan view of a portion of the same structure.

Fig. 11 is a perspective of a fragment of the modified structure of Fig. 9 illustrating the upper section of the low end wall assembly.

Fig. 12 is a perspective of a modification of the upper section of the low end wall deflector for use with the assembly of Fig. 9.

Fig. 13 is a longitudinal section of a modified end wall structure and deflector plate.

Fig. 14 is a similar section with the slip plate or upper end wall section in position.

Fig. 15 shows a fragmentary view of the connection between the slip plate of Fig. 14 and the side wall.

Fig. 16 is a longitudinal section of a portion of one end of a convertible mine car illustrating a modified type of deflector support.

Fig. 17 is a longitudinal section through the dump end of a mine car embodying a modified type of convertible end wall and deflector sheet portion.

Fig. 18 is a similar view showing a reversible upper end wall section and deflector sheet.

Fig. 19 shows the upper end wall section of Fig. 18 in upright position to complete the end wall structure.

Fig. 20 is a sectional view of a mine car with the end wall modified to embody an upper hinged section.

Fig. 20a is a perspective of a modified form of upper end gate section.

Fig. 21 is a longitudinal section through a modified form of mine car with a modified deflector sheet in position.

Fig. 22 is a similar view embodying the conventional lift end gate.

Figure 23:
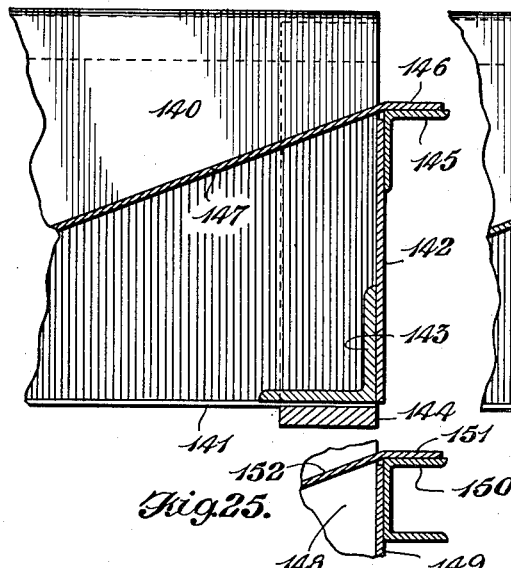

Figs. 23 to 30 inclusive are longitudinal sections through the dump end of mine cars of the type embodied in the present invention showing modifications of the low end wall structure and reinforcing bar.

Figs. 31 to 34 inclusive are longitudinal sections of mine cars designed for use in connection with mines of low ceiling and illustrating modified forms of removable deflectors in connection with angle end walls.

Fig. 35 is a top plan view of one end of a mine car showing a sectional deflector.

Fig. 36 is a longitudinal section through the end of a mine car embodying a sectional deflector, and Fig. 37 is a perspective, partly fragmentary view showing a sectional deflector in position with reference to the drawbar.

Referring to Figures 1 and 2 there is illustrated in side elevation and end elevation a low level mine car of the general type shown and described in the C. P. Daniel Patent No. 2,003,878. Cars of this type include wheels A, axles and axle bearings B, central lading bottom portions C and wing lading portions D. The combined bumper and coupler structure for each end of the car body is indicated by reference character E with the drawbar F closely conforming to the lower adjacent portions to increase to a maximum the lading capacity of the floor by permitting a snug application of the deflector plate more clearly hereinafter described.

The lading body includes the floor sheet 1 for the central lading portion C and the wing floor sheets 2 and 3 for the side lading portions D. Side walls are illustrated at 4 and the end walls at 5 and 6. The side walls 4 and the end wall 5 are of uniform height and may be provided with the conventional rolled edges 7 and suitably braced and supported by belts or straps 8 and other means conventional in the art.

The present development is limited to that portion of the car body utilized in the end dump operation and essentially this embodies that end having the short end wall 6. Generally this end wall is of such a height as to permit maximum loading of the car without spilling of the lading, it being conventional in car loading operations to place along the upper marginal edges of the walls large lumps of coal which tend to confine the lading. Obviously, in using this short end wall, it will be the practice for the operator to place large lumps along its upper marginal edge to permit capacity loading for end dump operations. For rotary dump operations means in the form of a removable wall section or panel may be provided for adding to the height of this shortened wall, thus making it possible to construct with a minimum amount of labor a car for rotary dump operation with four walls of uniform height. The utilization of the removable upper wall panel or section will be optional during the rotary dump use of the car, the variance in the load capacity being a factor determining the use of this feature of the development.

In certain of the modifications there has been illustrated the rearwardly positioned intermediate sill 9 against which the filler blocks 10 of the bumper construction engage. Because of the use of this rearwardly positioned intermediate sill 9 it is essential that the central portion of the lading body extend upwardly over the intermediate sill and this embodies the central draft bar 11 and the drawbar F. The end structure of the car does not affect the present invention except as regards details of construction, the broad inventive thought being present in each instance where a rotary dump car is converted into an end dump car by the use of a shortened end wall and a cooperating detachable deflector plate, with or without an upper removable end wall portion. The invention is obviously adaptable in mine cars not using the low central lading portion.

Referring to Figs. 1, 2 and 3 the shortened end wall 6 is shown provided with the outwardly rolled upper edge 7 which provides a substantially flat horizontal portion 8 upon which rests the outer horizontal edge 15 of the deflector plate G. The deflector plate G, includes a main deflector sheet 16 which extends from side wall to side wall and central deflector sheet 17 which is of a width to be confined snugly between the side walls of the central lading portion C. As illustrated in Fig. 2 these side walls of the central lading portion are formed by the Z-beams 18 which have upper and lower flanges engaging the adjacent marginal edges of the floor sheet portions. The deflector plate is formed with horizontally extending flanges 19 which lie flush upon the floor surface of the wing portions D and horizontally flanged portion 20 which rests on the central lading floor portion. The flanged portion 20 is interrupted intermediate its length to permit the structure to straddle the central draft bar 21 which extends throughout the length of the car body in the present illustration. The outer horizontal marginal edge portion 15 of the deflector and the flanges 19 and 20 which rest upon the floor sections may be secured in position by any suitable means which will permit their convenient removal or positioning whereby it is possible to convert the car from rotary to end dump type. In the illustrations the overlapping horizontal portion 15 of the deflector sheet is shown as secured in position by rivets, however, where conditions warrant and where the facilities permit, bolts or even welding operation may be utilized to provide the essential tacking of the parts in such a manner that removal is possible without injuring the balance of the structure.

Numerous modifications are shown and comprehend various structures and methods of shaping the deflector plate and securing the deflector plate either to the floor, side walls or end wall of the car structure. In each of the modifications the invention is broadly identical, permitting the conversion of the rotary dump to an end dump car by the quick and convenient application of a deflector as heretofore outlined. In that form of the invention shown in Figs. 5 and 6 the connection between the deflector G and the floor portions is the same as in Figs. 1, 2, 3 and 4, however, in this latter modification the deflector sheet is somewhat of reduced angle and accordingly positioned more closely against the drawbar F and floor. The outer portion of the deflector sheet is provided with an upwardly bent "kick out" portion 25 of increased angle adjacent the horizontal edge portion 26 which latter rests upon the flattened upper edge of the shortened end wall 27 and is secured thereto by bolts or the like as in the preceding form. The purpose of this particularly shaped deflector sheet is to increase the lading capacity when in end dump operation. Obviously the deflector sheet being dropped slightly lower permits a correspondingly increased loading capacity. Also the portion 25 increases the velocity of the discharging lading and lifts it over the bumper and coupler.

In Figs. 7 and 8 a third modification of the deflector sheet is illustrated. The method of attaching the deflector sheet may be identical with the preceding forms, however, it may be noted that this deflector sheet has been rolled, stamped, or otherwise shaped, so that it conforms as exactly as possible to the adjacent floor and drawbar F above which it is positioned.

This deflector sheet is shown as substantially depressed at 28 and 29 to enable it to fit snugly within the pockets formed by the lower adjacent angular shaped draft element F. The curving of this deflector sheet does not interfere with the discharge of the lading, the angle of the sheet being substantially the same as in the other forms except towards its outer edge where the angle obviously is increased as at 30 which will lend to the efficiency of the discharging operation.

In Figs. 9, 10, 11 and 12, two distinct changes have been shown in the development. In the first instance, transverse straps 31 are riveted or otherwise secured in position across the floor portions, the straps being offset upwardly to provide pockets in which the floor engaging horizontally flanged portions 32 of the deflector sheet are received. When the horizontal portions of the deflector sheet are received in these pockets they may be bolted or riveted in fixed position by means of the fastenings 33 as shown or it may be found that the positive locking of these parts at this point is unnecessary. As in the previous forms the outer edge of the deflector plate is formed with the marginal horizontal edge portion 34 which rests upon the flattened portion of the short end wall 6 and is secured thereto by bolts or other means for providing a detachable assembly. Where the deflector is not used, as in instances where the car is utilized in rotary dump operations then the shortened wall may if desired, be built up to a point flush with the top of the sides and other end wall. To accomplish this there is utilized the angle 35 with the lower flange turned outwardly to rest upon the flattened portion of the shortened wall, thereby providing a removable upper end wall panel. By reference to Fig. 11 it will be noted that this end wall extension or panel has its upper flange extending beyond the lower flange and bent inwardly at 36 to engage the outer adjacent face of the side walls within the rolled edge portion. At 38 the upper offset extremity of the rear end belt is shown as extending between the outer and downwardly extending rolled edge 38' and the side wall. In lieu of this structure an insert may be welded in the open rolled end of the side wall and as shown at 39 (Fig. 12) and a bolt hole formed therein whereby the upper end wall section may be bolted thereto. This form of the structure necessitates the extension of the upper end section or panel 35 to the full width of the side walls as defined by the outer rolled edges of the side walls.

Referring to Figs. 13, 14 and 15 both the deflector plate G and the end wall structure is modified. The deflector G is secured along the floor sheets by rivets or bolts 41 which extend through the flange 42 and the floor sheet as in previous forms, however, the side wall connection is by virtue of integral bent up flanges 43 formed along the marginal side edges. The flanges 43 are fastened to the side walls 44 by rivets or bolts 45 and may be formed of any length or width found desirable to provide a substantial support. The end structure includes inwardly faced angle or transverse frame member 46 connecting the floor sheet with the short end wall 47 by means of rivets 48. The upper edge portion of the end wall is offset outwardly to provide the shoulder 49 which is located in the illustration substantially midway between the upper marginal edge of the upright flange of the transverse angle 46 and the upper marginal edge of the end wall. The deflector sheet or plate G includes at its outer end and above the shortened end wall 47 the horizontal or flattened portion 50 downwardly from which extends the flanged edge 51 which rests upon the shoulder 49 of the end wall. To increase the strength of the structure and to assist in retaining the deflector sheet flange 51 in place corner angles 52 are provided. These corner angles are offset at 53 to snugly overlap the vertical leg of the frame element 46 and rivets are utilized at necessary points to secure these corner angles to the shortened end wall and one of these tying rivets is illustrated as extending through each of the corner angle braces, the upright flange of the under-frame member and the shortened end wall. By the structure shown the downwardly extending flange 51 of the deflector plate G is positioned adjacent each side wall in pockets between the angle member 52 and the offset upper portion of the end wall. The pocket so formed, when the car is being used for a rotary dump, forms a securing means for the slip plate 55 which completes the shortened end wall structure and raises its height to that of the other end wall and the side walls as shown clearly in Fig. 14. Referring to Fig. 15 it will be noted that this removable slip plate which forms the upper horizontal section of the short end wall 47 is rolled at its upper marginal edge 58, except at its extremities where the roll is flattened as shown at 59 to provide a reinforced doubled wall portion through which securing bolts or rivets 59' extend for engagement with the perforated block carried in the open rolled adjacent ends of the side wall as shown more clearly in Fig. 12.

In Fig. 16 a method of supporting the deflector plate G is illustrated that differs from the preceding modification in that the supporting angles 60 are not formed by flanging portions of the side edge portions of the deflector plate G upwardly. In lieu of this arrangement independent supporting angles 60 are riveted or bolted at the proper angle along the side walls 61 and the deflector is supported upon the inwardly projecting leg of these independent angle members. While in this illustration no means is shown for securing the angle plates 60 to the deflector plate G, nevertheless bolts or other suitable means may be used to secure these parts together. It will also be noted in this modification that the deflector plate is of a constant angle to a point defined by the extremity of the supporting angles 60 and at this point the angle of the deflector plate is increased to facilitate the discharge of the lading above the upper edge of the shortened end wall 63. The end wall structure is shown secured to the upwardly turned angle 64 which necessarily constitutes one of the body end frame members and as in the preceding forms, the upper portion of the short end gate is flanged outwardly to form a horizontal supporting surface 65 upon which rests the horizontal outer marginal edge of the deflector G. These parts i. e. the horizontal marginal edge of the deflector and the horizontal supporting surface 65 of the short end wall 63 may be secured as in preceding forms by suitable means such as bolts. The method of securing the deflector G to the lading floor, both the central lading portion and the wing lading portion may be by any of the methods illustrated in the present application or any other method found desirable and by means of which the removal of the deflector plate can be accomplished in converting the structure from a rotary dump to an end dump car.

In the modification shown in Fig. 17 a distinct departure is made in the structure of the end wall which is utilized in the conversion of the car from the rotary dump to the end dump type. In this modification the end wall is constructed in such a manner that at a suitable height it can be bent inwardly at an angle contiguous to the angle of the deflector plate for discharging lading in end dump operations or can be utilized in a full upright position to complete a standard end wall structure or an end wall structure corresponding in height to the opposite end wall or to the side walls as desired. Referring to the details of construction illustrated it will be noted that the end frame member 70 which is of angle form has its outer leg vertical to support the end wall 71. The lower leg of the angle frame member extends inwardly and has attached thereto the flooring sheet 73. A belt 74 may be provided for binding the floor sheets to the frame at this point and may extend upwardly along the outer faces of the side wall as is conventional. The end wall 71 is formed in the illustration of a single sheet which reaches to the height of the side walls and this sheet has adjacent its upper ends the inturned flanges or ears 76. These flanges 76 are of such a size as to extend in sufficiently to permit their perforation at suitable points for the reception of the fastening means as for instance bolts 77 which extend through the adjacent side walls. The lower edges 78 of these inturned flanges are cut at such an angle so that when the member 71 which forms the end wall is bent downwardly for end dump operation these lower angled edges 78 of the flanges 76 will abut the inner adjacent face 79 of the end wall plate and lend this amount of support to this structure. The perforations 77 formed in the ears will register when the end wall is in its turned down position with angularly arranged perforations formed in the side walls 80 and these parts can be further braced and secured by bolts which extend through these registering openings. It will be noted that the end wall 71 is bent inwardly throughout its entire length at a point immediately below the junction of the flange 76 and the wall. The deflector G is illustrated only fragmentarily inasmuch as this deflector may be of varied form insofar as its support of the side walls and its connections with the floor sheets is concerned. For purposes of illustration this deflector sheet G is shown as provided with upturned flanges 81 which are bolted to the side walls of the car. The deflector sheet G does not extend entirely to the end wall but only to the point overlapping the inturned portion of the end wall heretofore described and at their overlapping points they may be secured together by any means desired as long as such means permit the removal of the deflector G and the shifting of the upper portion of the end gate from its downwardly and inclined position to its vertical position, which latter it assumes for rotary dump operations.

In Figs. 18 and 19 a variation of that form ilustrated in Fig. 17 is shown. In this modification the inturned end frame member 85 has its lower flange attached to the floor sheet 86 and its upright flange suitably connected to the short end wall 87 the latter being offset below its upper edge to provide a shoulder 88. Angles 89 with lower offset portions 90 overlapping the frame member 85 are positioned inwardly of the end wall and extend upwardly to a point short of the termination of the end wall. The upper ends of the inturned flange of the corner angle members are inclined inwardly and downwardly at an angle coinciding with the angle of the deflector G hereinafter described. The corner angle member 89 together with the offset upper ends of the end walls forms pockets for the reception of the combined deflector section and end gate section. The combined deflector section and end gate section is constructed to be interchanged or shifted from inclined discharge position for cooperation with the main deflector sheet in end dump operation to vertical end wall position for completing the end wall structure in rotary dump operations. This convertible element includes a main plate 91 which extends from side wall to side wall, and two centrally located flanges 92 arranged at each side of the main plate. The flanges 92 at each end of the convertible member are of a length corresponding to the distance between the upper marginal edge of the fixed short end wall 87 and the upper edge of the side walls 93. The portions of the convertible plate along both its longitudinal edges and to each side of the flanges 92 are of a width approximating the depth of the pockets formed adjacent each side wall between the angle braces 89 and the fixed end wall section 87 and one of these marginal edges 94 is bent downwardly at such an angle that when it is fitted in the pockets heretofore mentioned it will position the sheet 91 to form a continuation of the main deflector sheet G. When the opposite marginal edge portion 95 is inserted in the pockets the down turned marginal edge 94 will form an outwardly extending reinforcement for the upper edge of the completed full height end wall structure as shown in Fig. 19. The flanges 92 are drilled or otherwise perforated at predetermined points and the side walls 93 are likewise drilled at predetermined points so that when these flanges are in their two positions, as when the convertible deflector and end wall section is in its end dump or rotary dump position, the perforations will register permitting the insertion of suitable fastening means. It will be noted that the main deflector G overlaps the marginal edge 95 of the convertible deflector section and end wall section, when the latter is in its end dump position to enable the insertion of suitable fastening means 96 as shown. It will also be noted that the main deflector sheet G is illustrated in this modification as having the upturned flanges 97 against the side walls of the car and through which the fastening means may extend. Obviously, this particular type of deflector sheet can be modified in accordance with the inventive thought contained in the present disclosure.

In the modification of Fig. 20 there is illustrated a variation of the thought contained in the modifications contained in Figs. 17, 18 and 19. In this modification the structure embodies the angle end frame member 100 having its lower flange for connection to the floor sheet and its upturned flange fixed to the permanent short end wall section 101. For converting the present modification from an end dump car to a rotary dump car or vice versa there is provided an element which forms both a deflector section and an end wall section and this convertible member is hinged to the car body for swinging movement to the desired position. The convertible deflector section and end wall section comprises a sheet 102 extending from side wall to side wall and this sheet is of a width sufficient to extend from the upper edge of the permanent end wall section 101 to the upper edges of the side walls 103. Hinges of any desired number or a single hinge may be utilized. The present embodiment comprehends strap sections 104 which extend from the horizontal flange of the end frame member 100 upwardly to a point beyond the upper marginal edge of the permanent end wall section 101, the straps at their upper ends being curved inwardly and downwardly to provide pintle openings for the rod or elongated pintle 105. By utilizing straps of the type shown and by positioning these straps at proper points in the structure they will form reinforcing elements for the fixed end plate 101 and particularly the corner structures at which two of the straps will be located. The convertible deflector plate and end gate section 102 will have companion hinge sections embodying straps 106 which are welded or otherwise secured to the plate 102 and bent upon themselves to provide eyes corresponding to the eyes of the hinged section 104 and which are adapted to register therewith to permit the insertion and passage of the pintle or hinged rod 105 which may extend from side wall to side wall or which may be sectional as desired. The hinges are so located that the convertible plate may be swung from downwardly inclined end dump position to vertical rotary dump position and in the latter instance the convertible plate is swung exactly in alignment with the fixed end gate plate 101 heretofore described. This arrangement is shown in dotted line with the convertible plate 101 for use when the structure is in position for rotary dump operation. An angle bar 107 may be fastened to the outer marginal edge portion of the convertible plate 102, when the latter is in vertical or rotary dump position, to reinforce this structure and to provide means for fastening same in this adjusted position. This angle bar 107 will extend beyond the ends of the plate 102 and will be bent inwardly for engagement with the adjacent outer faces of the end walls 103, preferably under the rolled edge of the latter. Bolts or rivets 108 will secure these parts together. In the end dump position the convertible panel is swung downwardly to the angle of the main deflector G which latter is illustrated as including upturned flanges 109 for securing the same to the side walls by means of bolts or other fastening means 110. It will be noted that the main deflector G overlaps the convertible deflector and end gate plate 102 and is secured by fastening means shown as rivets.

In Fig. 20ª a hinge convertible deflector sheet section and end gate section is shown as including the main panel 111, and the inturned flanges 112, the latter being perforated for suitable connection with the adjacent side walls. This convertible panel may be used in lieu of the panel 102 of Fig. 20.

In Fig. 22 the present invention is illustrated as adapted to mine car structures including the conventional lift end gate. These end gates are designed for end dump operation and include an end in the form of a lift gate so constructed and arranged that during the discharge of lading in an end dump operation it is moved upwardly permitting a clear passage of the lading within the car. It is proposed in the present modification that means be provided for converting such end dump structures for rotary dump operation by fastening through suitable means the end gate against any movement.

As heretofore proposed it is in some cases practical, in fact advisable, to construct a mine car with the end walls lower than the side walls. Structures embodying this feature are adaptable for use in mines in which low seams of coal are present and it will be apparent that greater lading clearance is obtained beneath the mine "top" and consequently the loading is materially facilitated. In conditions of this type it necessarily follows that a greater percentage of lump coal realization is present inasmuch as the operator with the added clearance is not hindered in the loading operation. The modifications hereinafter described appertain particularly to structures of the low end wall type, designed for use in mines with low seams, and comprehend end wall structures which while relatively cheap in manufacture, nevertheless, are particularly strong and durable and capable of lengthy use without any expense in repair or upkeep. The following modifications contain the main inventive thought in that they embody the removable deflector whereby conversion from the end dump mine car to the rotary dump mine car is obtained. It is not the intention to convey the idea that the proposed end wall structures now to be described are not capable of being built up to side wall height, if so desired by the simple addition of upper end wall sections of desired construction. Rather it is the intention to provide in the following modifications mine cars of the low end wall type, convertible from end dump to rotary dump, which are particularly adaptable for use in coal mines having low seams and wherein the extension on the end wall to bring the same to the side wall level is not desirable and wherein it may be advisable to construct the end walls in a particularly substantial and durable manner.

The illustrations contained in Figs. 23 to 36 inclusive, are fragmentary in that they involve only portions of the side walls, floor and other parts at one end of a mine car.

Figure 24:
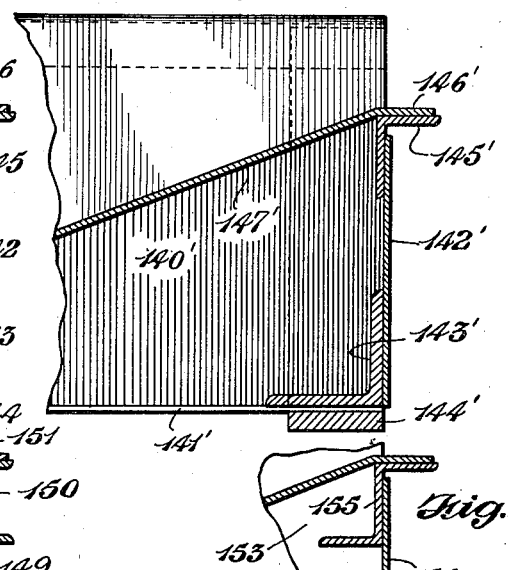
Figure 25:
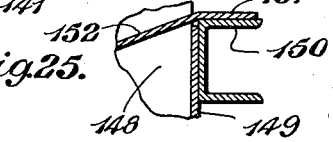
Figure 26:
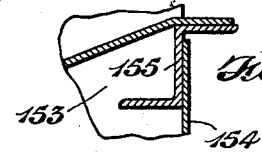

In Fig. 23 the side wall 140, floor plate 141 and end wall 142 are tied together as by the end frame element 143 and belt 144 which extends below the floor plate and upwardly along the ends of the side walls as is conventional in this type of structure. Along the upper marginal edge of the end wall 142 and secured to the plate or sheet comprising the same is the transverse angle 145 which may be secured in place in any desired manner as by welding, rivets, bolts or the like. This transverse angle has its upper horizontal leg projecting beyond the end wall and upon this horizontal leg of the angle member 145 the horizontal marginal edge 146 of the removable deflector plate 147 is positioned and is secured thereto by any temporary means such as heretofore mentioned as desirable. Fig. 24 is identical with the disclosure of Fig. 23, embodying the side walls 140', floor sheet 141', and end wall 142'. The end member 143' and belt 144' secure the foregoing elements. The transverse angle 145' is positioned differently from the disclosure of Fig. 23 in that the vertical leg of the angle is arranged inside the upper marginal edge of the end wall 142', rather than outside. The deflector plate 147' has the marginal horizontal portion 146' resting on the horizontal leg of the transverse angle 145', and the securing means is the same as in the preceding figure. In Fig. 25 the side wall 148 and the upper portion of the end wall 149 is shown. To the upper outer marginal edge of the end wall 149 a channel iron is attached with its upper horizontal leg 150 extending just above the edge of the end wall 149 and supporting the horizontal portion 151 of the deflector sheet 152. In Fig. 26 the side wall 153 and end wall 154 are illustrated and a Z angle is shown as extending transversely along the upper marginal edge of the end wall, with the vertical portion of the Z 155 secured by suitable means to the inner upper edge thereof.

Figure 27:
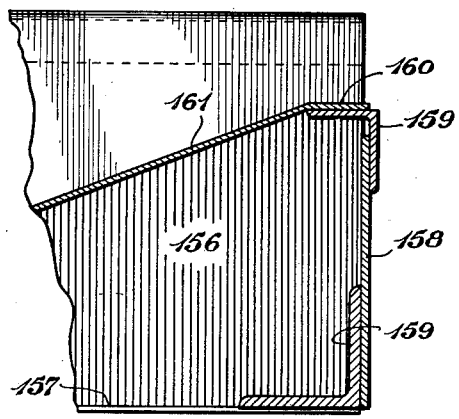
Figure 28:
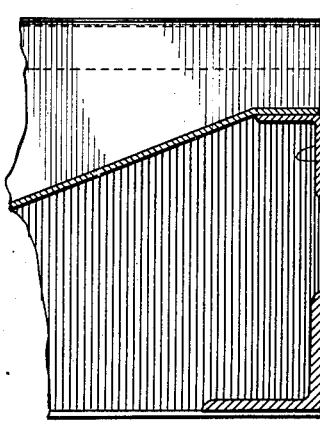
Figure 29:
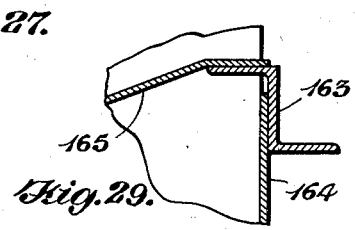
Figure 30:
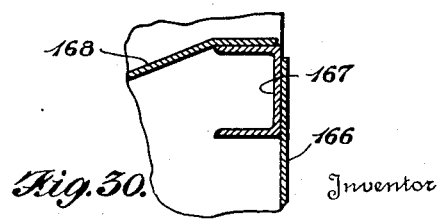

It will be noted in Figs. 22 to 26 inclusive, that the transverse reinforcing angle secured to the upper marginal edge of the end wall has, in each instance, a horizontal flange projecting beyond the end wall thus avoiding, except possibly in the form of Fig. 26, any interference with the discharge of lading during a rotary dump operation. In Figs. 27 to 30 inclusive these horizontal flanges are in each instance reversed, i. e., turned inwardly so that they project somewhat over the lading body. While these modifications are not the most desirable nevertheless, their use is practical inasmuch as the interference with the discharge of lading is merely nominal while a free outer wall structure is provided. In Fig. 27, reference character 156 indicates the side wall, 157 the floor sheet and 158 the end wall or end sheet of the end wall. The end frame member 159 ties the floor sheet 157 and end wall sheet 158 together in the usual manner. The upper marginal edge of the end wall sheet 158 has secured thereto the inturned angle 159, the vertical leg being attached as desired to the outer marginal face of this end sheet and the horizontal leg extending inwardly and supporting the horizontal marginal edge 160 of the deflector sheet 161. In Fig. 28 the identical elements are present, however, the angle 162 which corresponds to angle 159 of Fig. 27 has its vertical leg positioned against the inner face of the upper marginal edge of the end sheet, rather than outside. In Fig. 29 the transverse bar 163 has its upright web along the upper outer horizontal face of the end wall 164 and the upper horizontal leg projects inwardly to support the deflector sheet 165. In Fig. 30, the same parts are present except that the end wall sheet 166 has along its marginal edge the channel iron 167, the upper horizontal leg of which supports the deflector sheet 168. This transversely extending channel iron is secured along the inner upper marginal edge of the end wall sheet 166.

Figure 31:
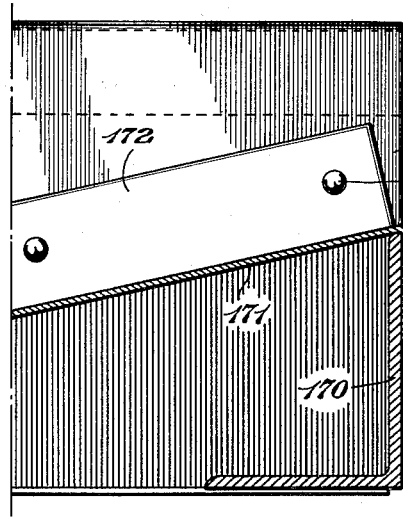

It is often found practical to construct a mine car of such low height that the end wall may be formed by the upright leg of an angle member, which angle member may constitute the end sill of the structure. In Figs. 31 to 36 inclusive such structures are illustrated. As in the preceding group of modifications each illustration is fragmentary in that it embodies only the essential portion of a mine car of the type in question. Referring particularly to Figs. 31 to 34 inclusive there is illustrated embodiments in which the so-called angle end wall structures are combined with removable deflector elements for the conversion from rotary to end dump types. In Fig. 31 the vertical leg 170 of the angle member, which may or may not constitute a body end frame structure, is of such a height as to constitute a satisfactory lading supporting end wall for use in that type of mine car utilized in mines of low seams. This upright leg 170 cooperates with the deflector sheet 171 in that this deflector sheet is supported thereby. The deflector sheet 171 is constructed with side flanges 172 which are secured by suitable means 173 to the side walls 174 of the car. The outer extremity of the deflector sheet 171 is flanged downwardly at 175 along the outer upper marginal edge of the angle end wall 170, the flange engaging the end wall snugly and securely as shown. The method of securing the inner or lower marginal edge of the deflector to the floor sheets may be of any desired type such as the modifications heretofore described in this application.

Figure 32:
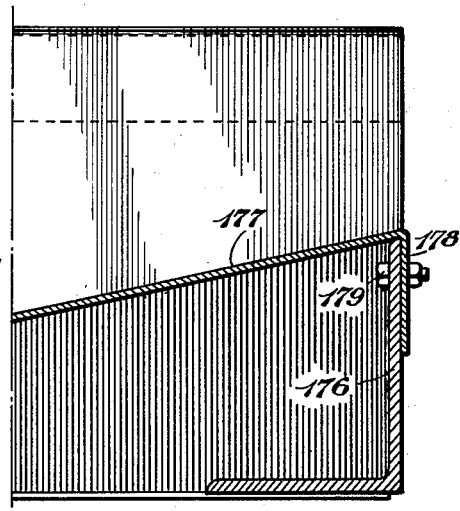
Figure 33:
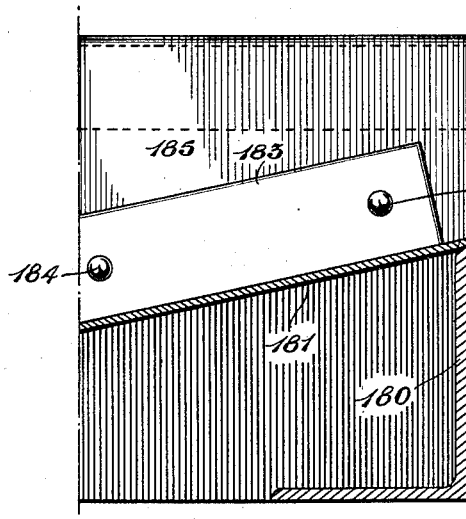
Figure 34:
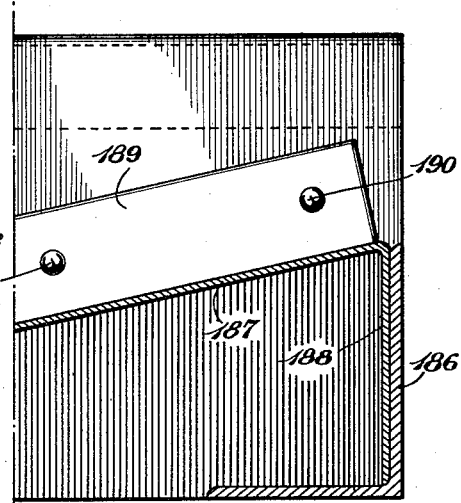

In Figs. 32, 33 and 34 the elements embodied in the structures are in each instance identical except for the structure of the deflector and its attachment to the upright leg of the angle end wall. In Fig. 32 the upright leg or end wall 176 cooperates with the deflector 177. The deflector in this modification is not secured to the side walls of the car body by flanges but is held in place by bolting the downwardly extending flange 178 to the outer face of the end wall 176 by bolts 179. The fastening of the deflector sheet securely to the end wall may eliminate the necessity of the securing means along the side walls of the car body. In Fig. 33 the angle end wall 180 supports the deflector sheet 181 along its upper edge 182. The deflector sheet being further retained in position by the longitudinal flanges 183 which are bolted or otherwise secured at 184 to the side walls 185 of the car. In Fig. 34, the angle end wall 186 cooperates with the deflector 187 in that the latter is provided with the down-turned flange 188 of a height equal to the height of the end wall 186 so as to engage throughout the entire inner face of the latter element. In this modification the support of the deflector is by virtue of the down-turned flange 188 and the up-turned side flanges 189 which latter are secured by means 190 to the side wall. In each of these modifications the deflector is supported in a manner to render it readily removable to enable an operator to convert the car from end dump to rotary dump.

The illustrations of Figs. 35, 36 and 37 are primarily for the purpose of disclosing a two part deflector sheet or a deflector sheet made from two plates which are constructed for arrangement on each side of the drawbar thus saving any fabrication or application costs as well as in the amount of material utilized. Referring first to Fig. 37, there is shown the drawbar 191 with the deflector sheets or sections 192 and 193 positioned on each side. It will be noted that the inclined portion of the deflector sheets are aligned with the upper surface of the inclined portion of the drawbar. The relative arrangement of a sectional deflector structure will be seen from an examination of Figs. 35 and 36. In Fig. 36 the intermediate sill 194, the combination shock absorber bumper means 195 and the angle end wall 196 are shown in section. The drawbar 191 and the deflector section 193 are illustrated with the deflector 193 terminating in the downturned flange 197 which engages the outer upper marginal edge of the end wall 196.

In Fig. 35 the deflector sections 192 and 193 may be seen in plan view with the drawbar 191 interposed therebetween. In this figure the side lading floor sheets are illustrated at 198 with the central lading floor sheet 199. The floor engaging flanges 209 of the deflector are secured in any desired manner to the floor sheets as described in connection with the preceding modifications of the development.

What I claim is:

1. A lading body for use as a rotary or end dump mine car including a bottom, side walls, and end walls, one of said end walls being of less height than the opposite end wall and side walls but of sufficient height to sustain substantially maximum lading, said end wall including an upper reinforced edge portion, a deflector plate being adapted to extend between and be connected to said bottom, said side walls and said reinforced edge, whereby when said deflector plate is secured in position the lading may be deflected over said wall of lesser height.

2. A lading body for use as a rotary and end dump mine car including a bottom, side walls, and end walls, one of said end walls being of less height than the opposite end wall and side walls but of sufficient height to sustain substantially maximum lading, said end wall including an upper marginal reinforcing flange, an inclined deflector plate being adapted to extend between said side walls and be connected at its lower end to said bottom and at its upper end overlying said reinforcing flange to deflect lading over said wall of lesser height, and said side walls forming guiding means for said lading to confine the same in its discharge over said wall.

3. A lading body for use as a rotary or end dump mine car including a bottom, side walls, and end walls, one of the end walls being formed in upper and lower horizontal sections, the lower section forming a permanent portion of the car body and being of less height than the opposite end wall and side walls, but of sufficient height to sustain substantially maximum lading, the upper edge of said lower permanent end wall section having an upper marginal reinforcing portion, the upper section of said sectional end wall being removably associated with the lower section and being detachably attached to the adjacent end portions of said side walls to brace said adjacent end portions of the latter against distortion, and a deflector plate adapted to extend between and be connected to the side walls, said car bottom and the reinforced edge portion of said lower end wall section for facilitating the discharge of lading thereover, upon removal of the upper end wall section.

4. A lading body for use as a rotary or end dump mine car including a bottom, side walls, and end walls, one of said end walls including a lower fixed section of less height than the opposite end wall and side walls, but of sufficient height to sustain substantially maximum lading and a removable upper end wall section, said removable upper section when associated with the lower section bringing both end walls to substantally the same height, and a deflector plate for association with said lower fixed end wall section for use in end dump operation, said deflector plate being adapted to extend between and be connected to said bottom and side walls and to the upper marginal edge of said lower fixed end wall section when said upper section is removed, whereby when said deflector is secured in position the lading will be deflected over the top of the fixed wall section.

5. A lading body for use as a rotary or end dump mine car including a bottom, side walls, and end walls, one of the end walls being formed in upper and lower horizontal sections, the lower section of the end wall being of less height than the opposite end wall and side walls but of sufficient height to sustain substantially maximum lading and including an upper reinforced edge portion, said lower end wall section being permanently connected at its ends to the adjacent end portions of said side walls, the upper horizontal end wall section being removably associated with said side walls and said lower end wall section, and a deflector plate adapted to extend between and be connected to the side walls, the car bottom and the reinforced edge portion of said lower end wall section for facilitating the discharge of lading thereover when the upper removable end wall portion is removed to permit end dump operation over said reinforced edge portion.

6. A lading body for use with a rotary or end dump mine car, a bottom, side walls and end walls, one of the end walls including upper and lower horizontal sections, the lower section being fixed and the upper section being movable away from the lower section, the upper marginal edge of the lower section being positioned sufficiently below the top edges of the side walls to permit the latter to constitute side guides during end dump operations but of sufficient height to sustain substantially maximum lading, a deflector plate extending from the bottom upwardly between the side walls, to the upper marginal edge of the fixed horizontal section of the end wall to deflect lading thereover, and means for securing the adjacent edge of the upper horizontal wall section or the adjacent edge of the deflector plate to the fixed horizontal section of the end wall.

7. In a lading body for use in rotary and end dump mine cars, a central lading bottom and wing lading bottoms, side walls and end walls, one of the end walls being formed of upper and lower horizontal sections, the lower section of said end wall including a horizontal supporting surface adjacent its upper marginal edge and said upper marginal edge being located sufficiently below the top edges of the side wall to permit the latter to form side guides for lading during end dump operations but of sufficient height to sustain substantially maximum lading, said upper section being removable to facilitate end dump operations, a deflector plate adapted to extend between and be connected to the bottom, said side walls and said horizontal supporting surface of said lower section whereby when the deflector is secured in position the lading may be deflected over said lower wall section.

8. The substance of claim 7 characterized in that the deflector plate includes a central portion and two wing portions, the central portion extending rearward of the wing portions and the rearward edges of the central portion and the wing portions of said plate are detachably secured to adjacent floor portions.

9. A lading body for use as a rotary or end dump mine car including a frame, a bottom, side and end walls carried by said frame, one of said end walls being of less height than the opposite end wall and side walls but of sufficient height to sustain substantially maximum lading while permitting the adjacent side walls to form guideways for lading discharged thereover, a drawbar fixed to the floor and extending upwardly over a portion of the low end wall, and a sectional deflector connected to the side walls, the floor and to the upper marginal edge of said low end wall, the sections of said deflector being arranged in a common horizontal plane with said drawbar and including portions removably positioned on each side of said drawbar and spaced by the latter.

10. A low level mine car comprising a frame including side and end sills, and a lading body, said body being for use in rotary and end dump operation and including a floor, side walls, and end walls, one of said end walls being rigidly attached to the adjacent ends of the side walls and reinforcing the same from top to bottom, the other of said end walls being of less height than the adjacent side walls and end walls but of sufficient height to sustain substantially a maximum lading, and being attached thereto in mutually supporting relation at a point lower than the adjacent ends of the side walls, said car being adapted to be dumped so that the lading will be discharged over the low end wall, the ends of said side walls adjacent the low end wall projecting upwardly above the same so as to guide the lading and keep it from spilling over the sides while it is being dumped over the low end during end dump operation, and a combined reinforcing and deflecting member extending upwardly from the floor at an angle and being attached to the upper end of said end wall and to said side walls in mutually supporting relation to furnish additional strength and stiffness adjacent the portions of said side walls which extend above and are unsupported by said low end wall, and to form a slideway for the cargo.

11. In a mine car including wheels, axles and a lading body having a bottom, side and end walls, one of said walls including a fixed lower section and an upper section hinged thereto, said fixed lower section having its upper marginal edge located sufficiently below the tops of the side walls to permit the latter to form side lading guides during end dump operations but of sufficient height to sustain substantially maximum lading, and an inclined deflector plate removably positioned in said lading body between said side walls, said floor and the upper marginal edge of said fixed end wall section for deflecting lading over the fixed lower end wall, said deflector including as a portion of its inclined lading discharge structure the hinged upper section of said end wall.

12. In a mine car including wheels, axles and a lading body having a bottom, side and end walls, one of said end walls including independent upper and lower sections, said lower section forming a permanent part of said car body and having its upper marginal edge located sufficiently below the tops of the said side walls to permit the latter to form side lading guides during end dump operation over said end wall section but of sufficient height to sustain substantially maximum lading, said upper end wall section being shiftable to an inwardly and downwardly inclined position, and an inclined deflector adapted to be positioned in said lading body and being connected to said side walls, said floor and said upper end wall section, when the latter is in its inwardly inclined position to provide a continuous deflector surface for guiding lading over the lower end wall section.

CHARLES O. CRUMP.